United States Patent [19]

Meeks

[11] Patent Number: 5,111,102
[45] Date of Patent: * May 5, 1992

[54] MAGNETIC BEARING STRUCTURE

[76] Inventor: Crawford R. Meeks, 5540 Mason Ave., Woodland Hills, Calif. 91367

[*] Notice: The portion of the term of this patent subsequent to Jan. 9, 2007 has been disclaimed.

[21] Appl. No.: 522,209

[22] Filed: May 11, 1990

Related U.S. Application Data

[63] Continuation-in-part of Ser. No. 356,413, May 25, 1989.

[51] Int. Cl.$^5$ .............................................. H02K 7/09
[52] U.S. Cl. ................................................... 310/90.5
[58] Field of Search ............... 310/90.5; 318/560, 611, 318/615, 624

[56] References Cited

U.S. PATENT DOCUMENTS

| | | |
|---|---|---|
| 3,890,019 | 6/1975 | Boden et al. . |
| 3,976,339 | 8/1976 | Sabnis . |
| 4,037,886 | 7/1977 | Boden et al. . |
| 4,072,370 | 2/1978 | Wasson . |
| 4,080,012 | 3/1978 | Boden et al. . |
| 4,128,280 | 12/1978 | Purtschert . |
| 4,405,286 | 9/1983 | Studer . |
| 4,563,046 | 1/1986 | Shimamoto . |
| 4,583,794 | 4/1986 | Takahara et al. . |
| 4,597,613 | 7/1986 | Sudo . |
| 4,626,754 | 12/1986 | Habermann ........................ 310/90.5 |
| 4,652,780 | 3/1987 | Murakami et al. . |

FOREIGN PATENT DOCUMENTS 2841256 4/1980 Fed. Rep. of Germany .
59-43220 3/1984 Japan .

*Primary Examiner*—R. Skudy
*Attorney, Agent, or Firm*—Kelly, Bauersfeld & Lowry

[57] ABSTRACT

A magnetic bearing structure is provided for supporting a rotatable member in a suspended position relative to a stationary member utilizing a constant flux axially polarized magnetic field and a variable flux radially polarized electromagnetic field. In one preferred form of the invention the bearing structure includes axially spaced apart rings associated with the stationary member, which hold a plurality of electromagnetic coils circumferentially about and radially spaced from a rotatable shaft. Electrical current is supplied to the coils generate a radially polarized electromagnetic field surrounding the shaft. At least one cylindrically shaped permanent magnet surrounds a portion of the shaft and is positioned generally between the pair of arcuate rings. The permanent magnet is axially polarized and is linked magnetically to the arcuate rings. Substantially all of the magnetic flux generated by the electromagnetic coils and the permanent magnet is direct radially through only a pair of air gaps between the shaft and the rings. Position sensors, along with a servo control circuit, detect and compensate for any radial displacement of the shaft to maintain it in a metastable position relative to the stationary member. In alternative embodiments the rotatable member may encircle the stationary member, and the permanent magnet may be replaced by a constant flux electromagnet.

27 Claims, 4 Drawing Sheets

FIG. 7
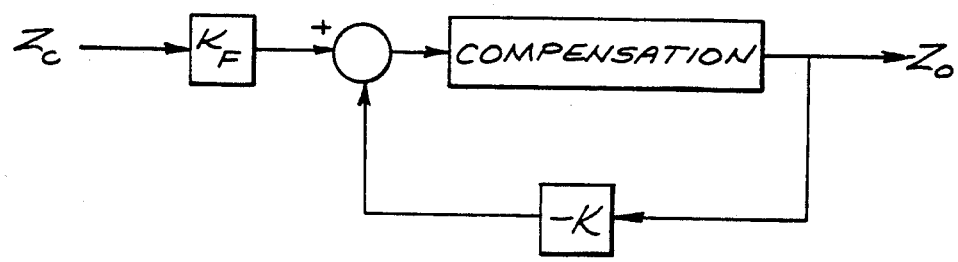
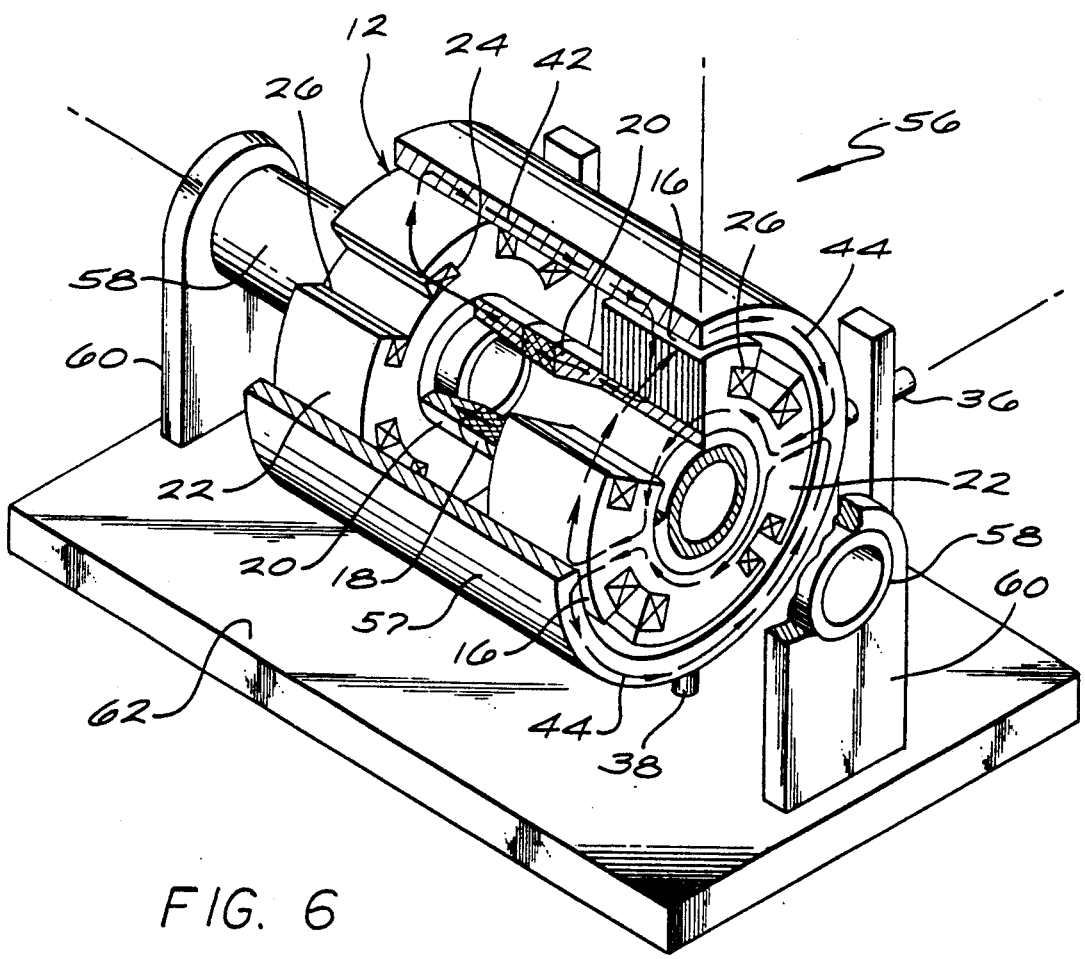
FIG. 6

MAGNETIC BEARING STRUCTURE

RELATED APPLICATION

This is a continuation-in-part of U.S. Pat. application Ser. No. 07/356,413, which was filed May 25, 1989 and entitled MAGNETIC BEARING STRUCTURE AND METHOD.

BACKGROUND OF THE INVENTION

This invention relates generally to improvements in magnetic bearing structures. More particularly, the present invention relates to a magnetic bearing structure which utilizes the combination of a controllable radially polarized electromagnetic field and a relatively constant axially polarized magnetic field, to suspend a rotatable member relative to a stationary member in a stable manner.

Electromagnetic bearings are highly effective for supporting a body, such as a rotating shaft, which is effectively floated or levitated by magnetic fields. In this way the rotating shaft has no frictional contact with any stationary structure, thereby permitting relatively friction free rotation of the shaft or rotation of a body about the shaft. This arrangement possesses the obvious advantage that there is no mechanical abrasion, which results in reduced mechanical noise and durability not available with other types of bearing structures. Moreover, because of the reduced frictional effects which would otherwise be encountered with conventional bearing structures, it is possible to obtain higher speeds of rotation with electromagnetic bearings.

Magnetic bearings typically require little maintenance and readily lend themselves to operation in hostile environments such as in connection with corrosive fluids where other conventional bearings would be destroyed or rendered inoperable. Further, magnetic bearings are suitable for supporting moving bodies in a vacuum, such as in outer space, or in canned pumps where the pump rotor must be supported without the use of physically contacting bearings.

Conventional electromagnets utilized for energizing levitation gaps are inefficient in that they require a substantial amount of electrical power to generate the required electromagnetic field. In general, prior electromagnetic bearings require large electromagnetic coils and electronic-controlled circuitry which have been found to be inherently inefficient. There have been some proposals to use permanent magnets in combination with electromagnets in order to provide greater stabilization and control. However, the conventional prior designs, which utilize both electromagnets and permanent magnets, are inefficient from a spacial standpoint and are considerably complex.

One of the primary considerations in the development of magnetic bearing structures is to eliminate so-called air gaps. The so-called air gaps form a portion of the magnetic flux pathway of the electromagnets and permanent magnets, and provide a bridge between a supporting structure and a levitated structure. In actuality, some air gaps must be tolerated in order to position a suspended or rotatable body. Thus, air gaps to some extent cannot be avoided, but it is desirable to reduce air gaps to an absolute minimum.

From a pure physics standpoint, an air gap introduces great inefficiency into any type of magnetic structure. An air gap is about 2,000 times less efficient than an iron core medium for transmitting magnetic flux. Thus, in terms of inefficiency, a magnetic bearing structure which has an air gap of 0.1 inch is far more inefficient than a magnetic bearing which has an iron gap of 20 inches.

In addition, it is important to overcome the conductivity constraints of permanent magnets. Essentially, permanent magnets are very poor conductors for a magnetic flux, even though they generate magnetic flux. The most efficient permanent magnets available are the rare earth alloy magnets. Such permanent magnets, however, have a very low magnetic permeability and they behave in much the same manner as air gaps in the magnetic circuit. The low permeability of rare earth alloy magnets require significant power to drive electromagnetic fields through the permanent magnets, thereby resulting in low electrical efficiencies. Thus, it is undesirable to transmit an electromagnetic field through a permanent magnet.

Accordingly, there has been a need for a novel electromagnetic bearing structure which utilizes both a radially polarized, controllable electromagnetic field and an axially polarized constant magnetic field to produce a compact and spacially efficient structure which is lightweight and obtains a high power efficiency. Additionally, there exists a need for an electromagnetic bearing structure wherein magnetic efficiency of the device is optimized by minimizing air gaps between the levitated and support structures, and wherein the electromagnetic coils are not required to provide magnetomotive forces to drive magnetic flux through permanent magnets. Further, such an electromagnetic bearing structure is needed in which relatively small electromagnetic coils may be employed to maintain the levitated structure in a desired position through use of a servo control circuit. Such a novel bearing structure should lend itself to concurrent use of electromagnets and permanent magnets for the purpose of providing a high density, constant magnetic flux between the associated structures, and should permit configuration of the magnetic bearing structure to rotate a levitated shaft within a housing, as well as a levitated cylinder generally encircling the support structure. The present invention fulfills these needs and provides other related advantages.

SUMMARY OF THE INVENTION

The present invention resides in an improved electromagnetic bearing structure for supporting a rotatable member in a suspended or levitated position with respect to a stationary member. The bearing structure comprises, generally, first and second means associated with the stationary member and axially spaced from one another, for generating a radially polarized controllable electromagnetic field surrounding respective portions of the rotatable member. Further, means associated with the stationary member and situated between the first and second electromagnetic field generating means, are provided for generating an axially polarized magnetic field. Substantially all of the magnetic flux from the first and second electromagnetic field generating means and the axially polarized magnetic field generating means, is directed radially through only a pair of air gaps between the rotatable member and the stationary member, to provide magnetic flux coupling of the rotatable member to the stationary member. The arrangement of the electromagnetic bearing structure of the present invention uniquely combines radially polarized, controllable electromagnetic fields with a relatively constant axially polarized magnetic field to produce a compact and spacially efficient system which is lightweight and which has a high degree of power efficiency. Furthermore, the use of the primary axially polarized field significantly reduces eddy current and hysteresis losses in the rotatable member.

In its most basic form, the electromagnetic bearing structure of the present invention utilizes the relatively constant axially polarized magnetic field to generate a high density magnetic flux which is radially directed through the pair of air gaps between the rotatable member and the stationary member. This provides a generally uniform magnetic field surrounding the rotatable member which, under perfect conditions, could theoretically suspend or levitate the rotatable member with respect to the stationary member. Such perfect conditions rarely exist, and certainly do not persist in an operating environment, and thus any displacement of the rotatable member relative to the stationary member will cause the rotatable member to be drawn into contact with a portion of the stationary member. This is known as the "negative spring" effect created by the constant magnetic field.

In order to counteract the "negative spring" effect, the present invention utilizes radially polarized controllable electromagnetic fields to stabilize the rotatable member in an optimum centered position relative to the stationary member. Variations in the positioning of the rotatable member are neutralized by an active electromagnetic servo control system which produces a "positive spring" effect, that is, a high stiffness restoring force. The present invention provides sensors which are positioned to detect radial displacement of the rotatable member. The servo control circuit can correct for any displacement of the levitated member by controlling the electromagnetic field forces. In this way, signals from the position sensors enable the servo control system to stabilize the rotatable member and maintain it in an optimal centered position.

In one preferred form of the invention, the first and second electromagnetic field generating means comprise a pair of arcuately shaped rings having a laminate construction and high magnetic flux permeability, which are located near the opposite transverse ends of a stationary housing. A plurality of electromagnetic coils are circumferentially positioned within each ring to be radially spaced from the rotatable member, which in the first preferred form is a shaft.

The axially polarized magnetic field generating means comprises a permanent magnet fixed to the housing radially outwardly from the shaft between the two arcuately shaped rings and the associated electromagnetic coils. The permanent magnet is axially polarized and is linked magnetically to the rings by cylindrically shaped pole pieces which extend from the permanent magnet to the rings.

In cases where the rotatable shaft may be of a material having a low magnetic flux permeability, a magnetically permeable armature is provided as a sleeve around the shaft. Magnetically permeable rotors which may be of a laminate construction, are fixed to the armature generally opposite each arcuately shaped ring to define the pair of air gaps through which substantially all of the magnetic flux generated by a permanent magnet and the electromagnets is directed.

Means for magnetically inhibiting translational movement of the shaft with respect to the housing include at least one circumferential groove on facing surfaces of the rings and the rotors. The high density magnetic fields across the air gaps tend to cause alignment of the grooves to control translational movement of the shaft with respect to the housing.

The electromagnetic coils positioned within the rings are controlled through the servo control circuit in order to provide the desired amount of electromagnetic flux and to thereby control the radially directed electromagnetic fields surrounding the shaft. The construction of the electromagnetic bearing structure permits generation of flux from the electromagnetic coils to be varied in order to obtain optimum positioning of the shaft, without requiring magnetomotive force to drive flux through the permanent magnet. In this manner, the structure maintains a high degree of power efficiency.

In a second illustrated embodiment of the present invention, the electromagnetic bearing structure utilizes rings which present a non-continuous face to the rotating shaft. In both of these embodiments, the shaft rotates within the housing.

In a third illustrated embodiment, the permanent magnet is replaced by a constant flux, axially polarized electromagnet. In some applications it is necessary to utilize electromagnets rather than permanent magnets due to operating constraints. For example, electromagnets are known to function at higher temperatures than many types of permanent magnets.

In still another embodiment, the electromagnetic bearing structure of the present invention can be constructed so that the rotatable member exteriorly surrounds or encircles the stationary member. The principles of construction and operation among the various illustrated embodiments remain the same, with all of the attendant advantages of spacial economy and power efficiency.

Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings:

FIG. 6 is a fragmented perspective view similar to FIG. 1, illustrating a fourth embodiment of an electromagnetic bearing structure of the present invention, wherein a hollow cylindrical rotatable member generally encircles a stationary housing for the flux generating mechanisms;

FIG. 7 is a schematic illustration of the functional operation of a servo circuit used in connection with the electromagnetic bearing structure.

DETAILED DESCRIPTION OF THE PREFERRED EMBODIMENTS

Figure 1:
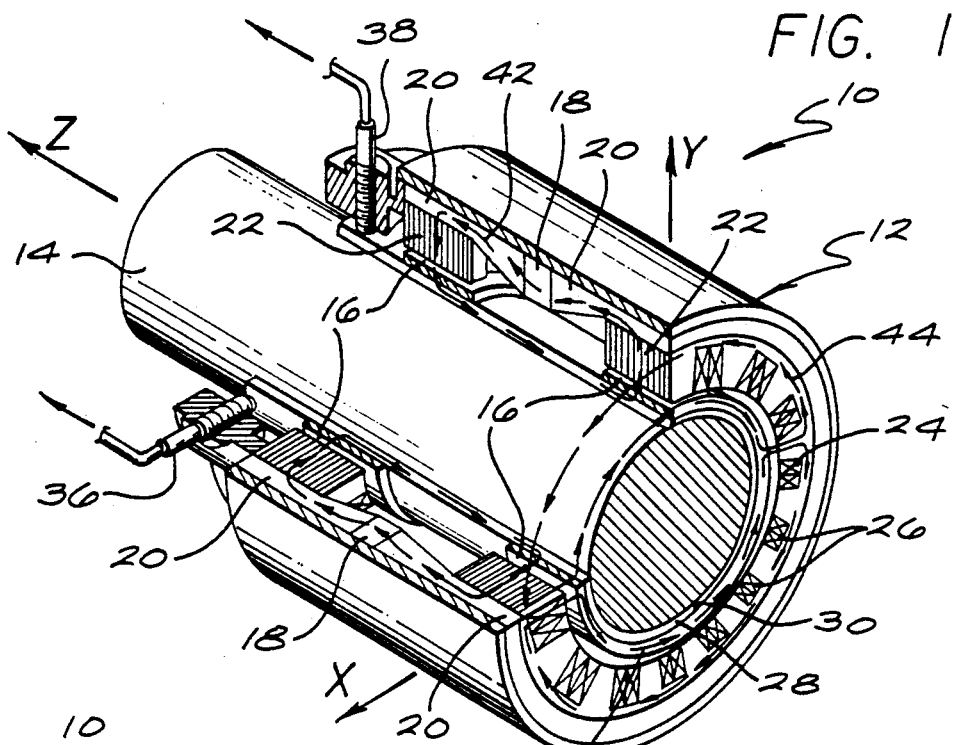
FIG. 1 is a fragmented perspective view of one preferred form of an electromagnetic bearing structure embodying the invention, illustrating exemplary magnetic flux paths generated by radially polarized controllable electromagnetic coils positioned adjacent to each end of the bearing structure, and an axially polarized permanent magnet situated generally between the electromagnetic coils.
Figure 2:
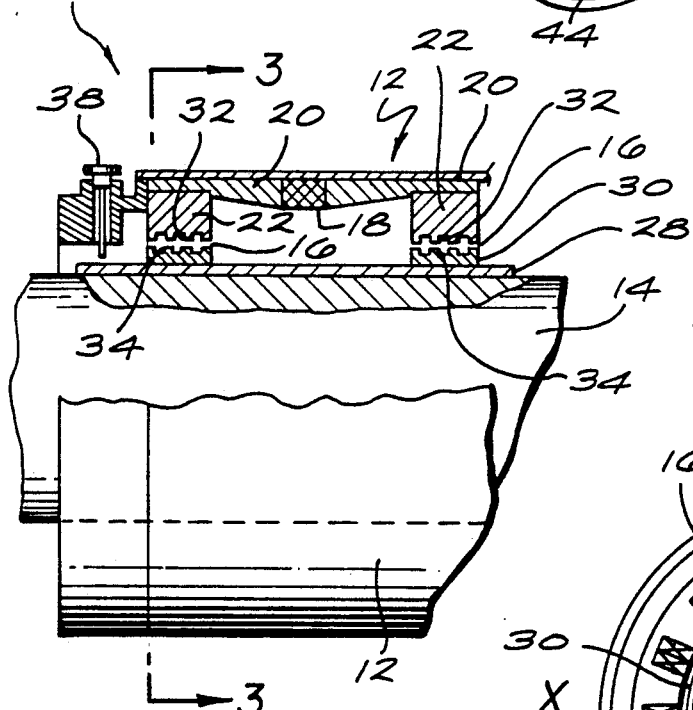
FIG. 2 is a fragmented, partially sectional side elevational view of the electromagnetic bearing structure illustrated in FIG. 1, showing the relationship of the permanent magnet to the electromagnetic coils, and further illustrating the two air gaps between a rotatable shaft and a stationary housing through which substantially all magnetic flux passes from the electromagnetic coils and the permanent magnet.
Figure 3:
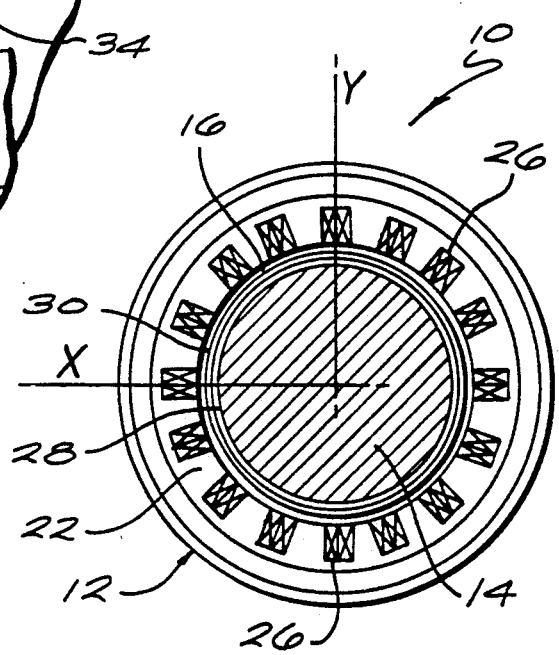
FIG. 3 is a partially sectional elevational view taken generally along the line 3—3 of FIG. 2.

As shown in the drawings for purposes of illustration, the present invention is concerned with an improved electromagnetic bearing structure, generally designated in FIGS. 1-3 by the reference number 10. The bearing structure 10 comprises a stationary outer housing 12 and a cylindrical rotatable shaft 14 which extends axially through the housing 12. The housing includes means for generating a high density magnetic flux through two air gaps 16 to suspend or levitate the shaft 14 within the housing.

In accordance with the present invention, and as illustrated with respect to a first preferred form of the invention in FIGS. 1 through 3, a disk-shaped permanent magnet 18 is centrally positioned upon an interior surface of the housing 12 so as to surround a portion of the shaft 14. This permanent magnet is axially polarized, and generally cylindrical pole pieces 20 abut the north and south pole surfaces of the permanent magnet 18 and extend therefrom to opposite ends of the housing 12.

A pair of arcuate rings 22, each preferably formed of laminated stacked plates and having a high magnetic flux permeability, are positioned at each end of the housing 12 in abutting relation with the respective pole pieces 20. Each of the arcuate rings 22 is provided with a plurality of circumferentially spaced apart individual slots 24 for receiving active control electromagnetic coils 26.

For purposes of illustration, the shaft 14 is presumed to be of a material having low magnetic flux permeability. In such cases, an armature or sleeve 28 is placed over that portion of the shaft encircled by the housing 12, and the sleeve is preferably formed of a high permeability magnetic material. A pair of rotors 30 are secured to the sleeve 28 in alignment with the arcuate rings 22 (see FIG. 2). The spacing between the rotors 30 and the facing surface of the arcuate rings 22 form the air gaps 16 mentioned previously. Further, it will be noted that circular grooves 32 and 34 are provided on the facing surfaces of the rotors 30 and the rings 22 in order to provide axial restoring forces between the housing 12 and the shaft 14, which tend to prevent axial translation 1 or 2-axis displacement of the shaft 14 when suspended within the housing 12. With a high density magnetic flux directed across the air gaps 16, the circular grooves 32 and 34 produce reluctance centering forces by tending to align the lands and grooves of the opposite faces.

The electromagnetic bearing structure 10 utilizes sensors in order to detect displacement of the shaft 14 relative to the housing 12. In this regard, an X-axis position sensor 36 and a Y-axis position sensor 38 are provided for sensing, respectively, X and Y-axis displacement of the shaft. The purpose of these sensors 36 and 38 is to detect movement of the shaft 14 from its optimal centered position. When the position sensors 36 and 38 detect an eccentricity of the shaft, they cause generation of electrical signals to a servo circuit 40, which is more fully illustrated in FIGS. 7 and 8. The servo circuit 40 will thereupon provide a restoring force by generating a signal to the electromagnetic coils 26 in such a manner so as to reposition the shaft 14 in its optimum centered position.

With the foregoing basic construction of the magnetic bearing structure 10 in mind, its function will be described in greater detail. The permanent magnet 18 generates a magnetic flux having a path illustrated by the arrows having a reference number 42. The permanent magnet 18 generates a relatively constant, high density magnetic flux which is conducted from the permanent magnet axially through a pole piece 20 to one of the arcuate rings 22, where the flux is redirected radially toward the shaft 14. The flux path 42 spans one air gap 16, is conducted through a rotor 30 to the armature 28, to an opposite air gap 16, and then back to the permanent magnet 18. It should be noted that the magnetic flux generated by the axially polarized permanent magnet 18 is directed radially through only a pair of air gaps 16, to provide magnetic flux coupling of the shaft 14 to the housing 12. Under perfect conditions, if the shaft 14 were to be precisely centered within the housing .12 so that uniform air gaps 16 existed completely around the shaft 14, then, theoretically, the high density magnetic field produced by the permanent magnet would create a radially directed force system which was metastable. However, any eccentricity of the shaft 14 will cause it to be drawn to one side or the other within the housing 12. This is the so called "negative spring" effect of the constant magnetic field provided by the permanent magnet 18.

The electromagnetic coils 26 positioned circumferentially around the shaft 14 by the arcuate rings 22 are controlled by the servo circuit 40 to counteract the "negative spring" effect and produce a "positive spring," that is, a high stiffness restoring force which keeps the shaft 14 centered between the arcuate rings 22. The reference number 44 identifies an exemplary magnetic flux path of the electromagnetic coils 26. Each of the electromagnetic coils 26 is capable of generating a radially polarized, controllable electromagnetic field, wherein the flux path 44 is directed across the air gaps 16 and conducted circumferentially about the shaft 14 through the armature 28 and the highly permeable arcuate rings 22.

In use, the magnetic field generated by the permanent magnet 18 tends to cause the shaft 14 to displace from a true centered position and into engagement with the arcuate rings 22. Such displacement is sensed by the X-axis and Y-axis position sensors 36 and 38 which provide input to a servo circuit 40. The servo circuit selectively controls electrical current to the electromagnetic coils 26 positioned by the arcuate rings 22, in order to provide a positive gradient which keeps the shaft in a true centered position. The greater the displacement of the shaft 14, the greater the restoring force generated through the use of the servo circuit 40 and the electromagnetic coils 26. Thus, a high density magnetic field is produced through the air gaps 16, which produces a radial force system which is metastable when the shaft is centered within the housing 12.

The permanent magnet 18 provides a high density magnetic field through the air gaps 16, which is necessary to support the shaft 14 in a levitated or suspended position within the housing 12. The electromagnetic coils 26 provide for stabilization of the shaft 14, and this arrangement results in a much more efficient bearing structure than previous types of electromagnetic bearing structures.

The above-described geometrically simple arrangement of an axially polarized magnet 18 for generating a relatively constant flux and radially polarized controllable electromagnetic coils 26 for generating a variable magnetic flux 44, yields greater force per unit size and weight than previously available electromagnetic actuators. Moreover, this arrangement achieves a spacially efficient compact package.

Figure 4:
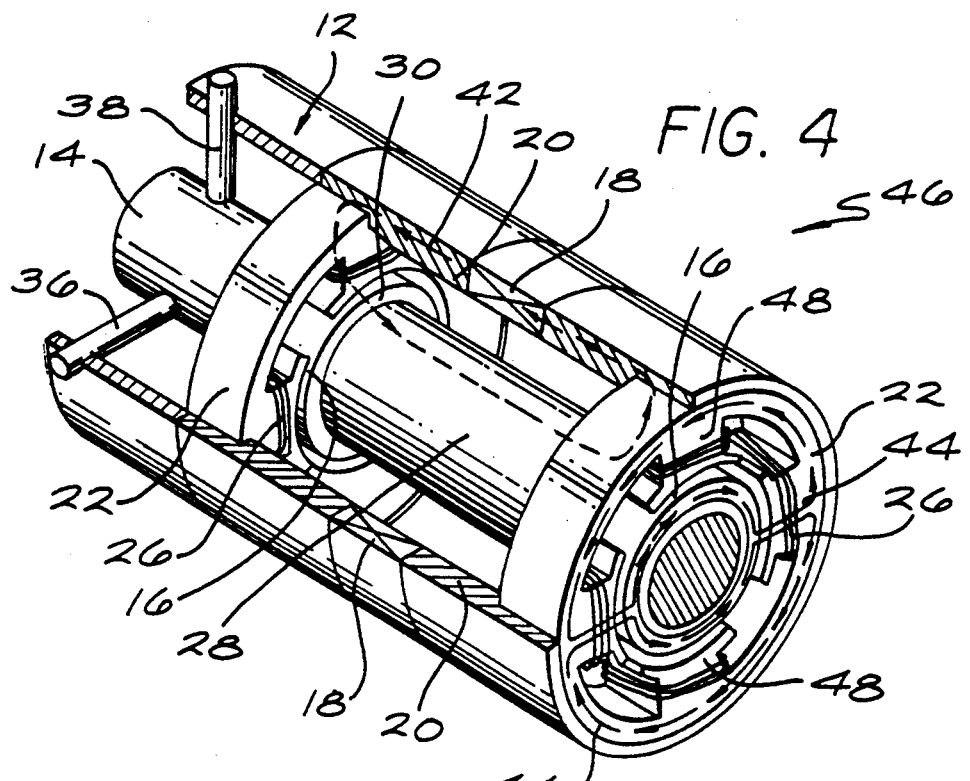
FIG. 4 is a fragmented perspective view similar to FIG. 1 illustrating a second embodiment of an electromagnetic bearing structure of the present invention.

A second preferred form of the invention is illustrated in FIG. 4, wherein functionally equivalent elements retain the same numbering as set forth in connection with the first embodiment of FIGS. 1-3. In FIG. 4 an electromagnetic bearing structure 46 is provided which is quite similar to the bearing structure 10 of FIGS. 1-3. Again, an axially polarized permanent magnet 18 is utilized to generate a constant flux magnetic field generally surrounding a rotatable shaft 14. The primary difference between the embodiment of FIG. 4 and the embodiment of FIGS. 1-3 lies in the construction of the rings 22 and the electromagnetic coils 26. In FIG. 4 the rings 22, which are still magnetically coupled to the pole pieces 20, do not present a continuous face toward the rotors 30. Rather, the rings 22 include four projecting members 48 which, collectively, define the air gaps 16. Thus, it can be seen that the air gaps 16 surrounding each end of the shaft 14 need not be continuous for purposes of the present invention.

Figure 5:
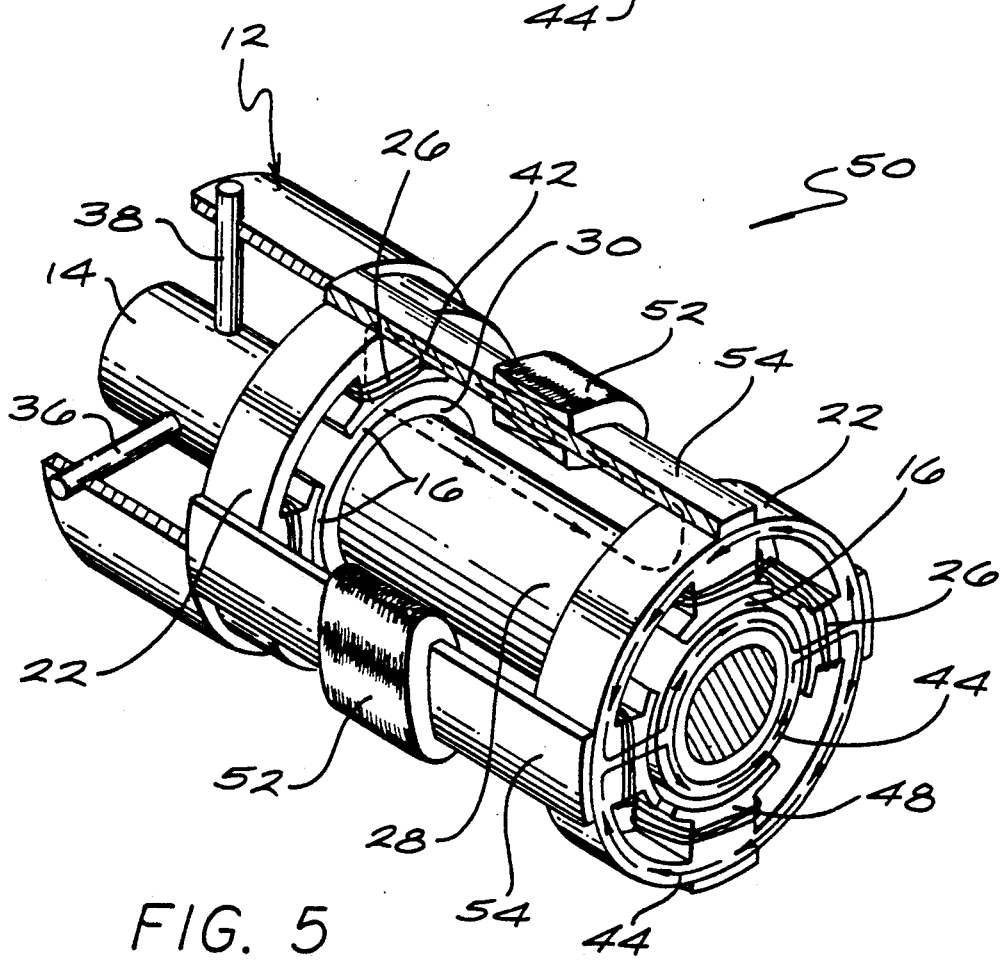
FIG. 5 is a fragmented perspective view of yet another embodiment of an electromagnetic bearing structure of the present invention, illustrating, in particular, the substitution for and use of constant flux axially polarized electromagnets for the permanent magnet shown in FIG. 1.

A third embodiment of the present invention is illustrated in FIG. 5. Again, functionally equivalent elements have retained the same numerical designations as set forth in the discussion of the first embodiment in FIGS. 1-3. In FIG. 5 an electromagnetic bearing structure 50 is essentially equivalent to that illustrated in FIG. 4 with the exception that the permanent magnet 18 is replaced by four constant flux axially polarized electromagnets 52. Further, the pole pieces 20 are replaced by magnetically conductive bars 54 which provide the required magnetic flux pathway for the flux path 42. In this embodiment, the electromagnets 52 provide the high density magnetic field across the air gaps 16 in the same manner as the permanent magnet 18 did in the prior illustrated embodiments. This tends to create the "negative spring" effect, which is neutralized by controlling the electromagnetic coils 26 positioned about the projecting members 48.

FIG. 6 illustrates still another embodiment of the present invention. In FIG. 6, an electromagnetic bearing structure 56 is illustrated wherein the shaft is not positioned within the housing 12, but rather a hollow cylindrical rotatable member 57 is positioned to exteriorly surround or encircle the housing. The rotatable member 57 in FIG. 6 is the funeliseral equivalent of the shaft 14 illustrated in FIGS. 1-5. In this arrangement the magnetic flux generating mechanism fixed to the housing 12 interiorly surrounds the rotatable member 57. The housing 12 includes a stationary support 58 which is mounted within upwardly extending projections 60 of a support base 62.

FIG. 7 represents a schematic view of the servo circuit 40 which is utilized in connection with the magnetic bearing structures of the present invention. The servo circuit comprises an input signal Zc which represents a displacement signal for displacement of the shaft 14 or rotatable member 57 as sensed by the X-axis and Y-axis position sensors 36 and 38. Both the constant and the controllable magnetic flux dynamics of the magnetic bearing structure can be approximated by a force gain designated as $K_F$ and a negative spring constant -K. The servo circuit 40 will provide an output correction signal Zo, which will stabilize and control the shaft radial position, that is, in both the X-axis and Y-axis positions, so that with reference to FIG. 1, the shaft is maintained at a null position and suspended between the arcuate rings 22.

The radial position of the shaft 14 or rotatable member 57 is inherently unstable and the servo circuit 42 provides a sufficiently-damped response for stability. Control is achieved by compensating the output signal of the radial sensor and feeding it back to the input of a current amplifier forming part of a compensation circuit.

FIG. 7 schematically illustrates the compensating circuit by a box labeled "compensation" and which, in effect, consists of a lead/lag network. This network is designed to cancel the negative spring constant or otherwise reduce the spring constant to as close to a zero level as possible. The lead/lag network also adds a positive spring effect so achieve a desired radial stiffness and provides adequate damping to prevent ringing and attenuate any resonances.

Figure 8:
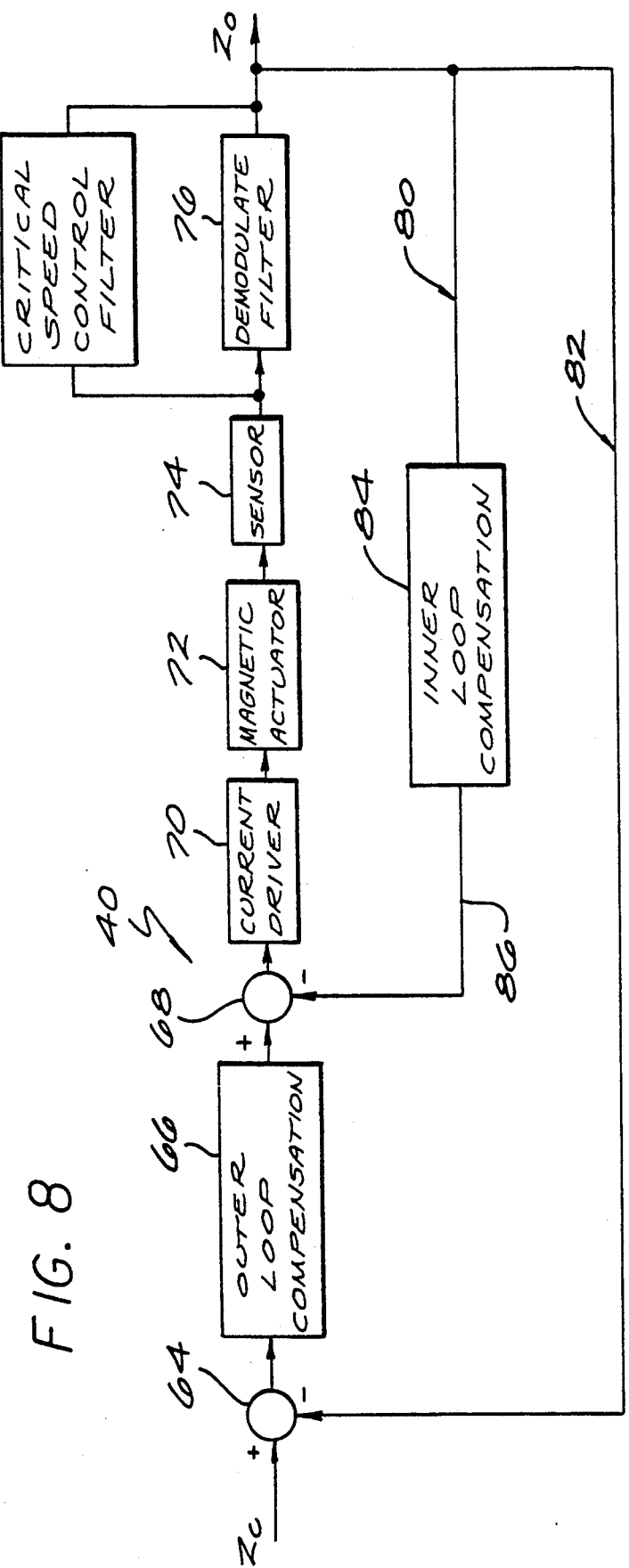
FIG. 8 is a schematic circuit diagram of the servo circuit illustrated generally in FIG. 7.

FIG. 8 more fully illustrates some of the major components, by functional description which form part of the servo circuit 40 of the presence invention. The input signal Zc is introduced as a summing node, or so-called junction 64, which is then introduced into an outer loop compensator 66. The output of the outer loop compensator 66 is then introduced into another summing node 68 and its output is introduced into a group of circuit which provide for the compensation previously described.

The output of the summing node 68, more specifically, is introduced into a current driver 70 and then into a magnetic actuator 72. The actuator 72 has its output directed to a sensor 74. The output of the sensor 74 is introduced into a demodulating filter 76 and a critical speed control filter 78. The outputs of these two filters are then summed to provide the correction signal Zo.

An inner loop compensator feedback network 80 is also provided along with an outer loop compensator feedback network 82. The outer loop network 82 is comprised of a single conductor having a negative input at the summing node 64. The inner loop compensator network 80 includes an inner loop compensator 84 located in a conductor 86, the latter of which provides a negative input signal to the summing node 68.

The outer loop network 82 is closed about the inner loop network and provides a feedback signal to the junction 64 for position command input signals. Under normal operating conditions, this command input signal will be zero or a bias to offset any bearing asymmetries.

The critical speed filter 78 and the demodulating filter 76 are effectively notched filters which limit oscillation of the shaft at critical speeds. These notched filters can be designed based on dynamic analysis prediction of the critical speeds.

Furthermore, these filters will lower or raise the servo gain at critical shaft frequencies and will thereby prevent magnetic bearing reaction forces at critical frequencies from contributing shaft resonance responses. If desired, these filters may be adjustable to allow for tuning to actual rotor response characteristics.

The sensor 74 will include various individual sensors detecting operation of the magnet bearing housing and are not limited to the X-axis and Y-axis position sensors 36 and 38. These sensors 74 may include, for example, temperature sensors and the like which will be used to alter the control algorithms.

From the foregoing it is to be appreciated that the improved electromagnetic bearings structure of the present invention is capable of supporting a shaft or rotatable member in a suspended position relative to a stationary body or housing utilizing an axially polarized magnetic source for generating a constant flux together with radially polarized controllable electromagnetic fields. The disclosed structure produces very compact and spacially efficient systems which are light in weight and which yet have a high power efficiency. Magnetic efficiency is optimized due to the fact that the electromagnetic coils do not have to provide magnetomotive force to drive flux through permanent magnets. Further, because a high density magnetic flux is generated independently of the controllable electromagnets, relatively small electromagnetic coils may be employed which result in lower power losses and permit use of small control amplifiers.

Although four particular embodiments of the invention have been illustrated and described in detail for purposes of illustration, various modifications of each may be made without departing from the spirit and scope of the invention. Accordingly, the invention is not to be limited, except as by the appended claims.

I claim:

1. An electromagnetic bearing structure for supporting a rotatable member in a suspended position with respect to a stationary member, the bearing structure comprising:
   first means associated with the stationary member for generating a radially polarized, controllable electromagnetic field surrounding a first portion of the rotatable member;
   second means associated with the stationary member and axially spaced from the first electromagnetic field generating means, for generating a radially polarized, controllable electromagnetic field surrounding a second portion of the rotatable member;
   means associated with the stationary member for generating an axially polarized magnetic field, wherein the axially polarized magnetic field generating means is situated between the first and second electromagnetic field generating means; and
   means for directing substantially all magnetic flux from the first and second electromagnetic flux generating means and the axially polarized magnetic field generating means, radially through only a pair of air gaps between the rotatable member and the stationary member, to provide magnetic flux coupling of the rotatable member to the stationary member.

2. An electromagnetic bearing structure as set forth in claim 1, wherein the first and second electromagnetic field generating means each include a plurality of electromagnetic coils circumferentially positioned about the stationary member and radially spaced from the rotatable member.

3. An electromagnetic bearing structure as set forth in claim 2, wherein the first and second electromagnetic field generating means each include an arcuately shaped ring of high magnetic flux permeability, in which the plurality of electromagnetic coils are positioned.

4. An electromagnetic bearing structure as set forth in claim 3, wherein the axially polarized magnetic field generating means is linked magnetically to the arcuately shaped rings.

5. An electromagnetic bearing structure as set forth in claim 1, including means for magnetically inhibiting axial translational movement of the rotational member with respect to the stationary member.

6. An electromagnetic bearing structure as set forth in claim 5, wherein the translational movement inhibiting means includes facing magnetic flux conducting rings on, respectively, the rotating and the stationary members, wherein a gap between the rings defines at least one of the air gaps, each ring having at least one circumferential groove in alignment with a similar groove in a facing ring.

7. An electromagnetic bearing structure as set forth in claim 1, wherein the axially polarized magnetic field generating means includes a plurality of electromagnetic coils circumferentially positioned about a stationary member between the first and second electromagnetic field generating means.

8. An electromagnetic bearing structure as set forth in claim 1, wherein the axially polarized magnetic field generating means includes permanent magnet means generally surrounding a portion of the rotatable member and linked magnetically to the magnetic flux directing means.

9. An electromagnetic bearing structure for supporting a rotatable member in a suspended position with respect to a stationary member, the bearing structure comprising:
   a pair of arcuate rings associated with the stationary member;
   a plurality of electromagnetic coils positioned on each of the rings circumferentially about the stationary member and radially spaced from the rotatable member;
   means for providing a controlled electrical current to the coils to generate a radially polarized electromagnetic field surrounding the rotatable member;
   means associated with the stationary member for generating an axially polarized magnetic field generally surrounding the rotatable member, the axially polarized magnetic field generating means being linked magnetically to the arcuate rings; and
   means for directing substantially all magnetic flux from the electromagnetic coils and the axially polarized magnetic field generating means, radially through only a pair of air gaps between the rotatable member and the stationary member, to provide magnetic flux coupling of the rotatable member to the stationary member.

10. An electromagnetic bearing structure as set forth in claim 9, wherein the rings are of a laminate construction to reduce the effects of eddy currents therein.

11. An electromagnetic bearing structure as set forth in claim 9, including means for magnetically inhibiting translational movement of the rotational member with respect to the stationary member.

12. An electromagnetic bearing structure as set forth in claim 11, wherein the translational movement inhibiting means includes magnetic flux conducting rotors fixed to and circumscribing portions of the rotatable member to be positioned in a facing relationship with the arcuate rings associated with the stationary member, wherein gaps between the rotors and the arcuate rings define the air gaps, and further wherein each rotor has at least one circumferential groove in alignment with a similar groove provided on a facing surface of the opposite arcuate ring.

13. An electromagnetic bearing structure as set forth in claim 9, wherein the axially polarized magnetic field generating means includes a plurality of electromagnetic coils circumferentially positioned about the stationary member between the pair of arcuate rings.

14. An electromagnetic bearing structure as set forth in claim 9, wherein the axially polarized magnetic field generating means includes permanent magnet means generally surrounding a portion of the rotatable member and linked magnetically to the arcuate rings.

15. An electromagnetic bearing structure as set forth in claim 14, wherein the permanent magnet means includes an axially polarized arcuately shaped permanent magnet associated with the stationary member and surrounding a portion of the rotatable member, the permanent magnet being located intermediate of the arcuate rings and associated electromagnetic coils, and linked magnetically to the rotatable member through the two air gaps such that the axially directed flux from the permanent magnet is re-oriented to radially pass through the air gaps to create a high density magnetic field and which provides for a magnetic field linked to the rotatable member.

16. An electromagnetic bearing structure as set forth in claim 14, including arcuately shaped pole pieces extending between the permanent magnet means and the pair of arcuate rings.

17. An electromagnetic bearing structure as set forth in claim 9, wherein the air gaps are located in proximity to opposite ends of the bearing structure.

18. An electromagnetic bearing structure as set forth in claim 9, including a magnetically permeable armature fixed to and surrounding the rotatable member, wherein the armature extends between the two pair of air gaps.

19. An electromagnetic bearing structure for supporting a rotatable member in a suspended position with respect to a stationary member, the bearing structure comprising:
   a pair of arcuate rings associated with the stationary member;
   a plurality of electromagnetic coils positioned on each of the rings circumferentially about the stationary member and radially spaced from the rotatable member;
   means for providing a controlled electrical current to the coils to generate a radially polarized electromagnetic field surrounding the rotatable member;
   means associated with the stationary member for generating an axially polarized magnetic field generally surrounding the rotatable member; and
   a pair of pole pieces extending between and connecting the axially polarized magnetic field generating means and the pair of arcuate rings so that magnetic flux from the axially polarized magnetic field generating means is directed through the rings for magnetic linking to the rotatable member together with the magnetic flux generated by the electromagnetic coils.

20. An electromagnetic bearing structure as set forth in claim 19, including means for forming only a pair of radial air gaps surrounding the rotatable member between the rings and the rotatable member to enable magnetic flux generated by the coils and by the axially polarized magnetic field generating means to be linked to the rotatable member.

21. An electromagnetic bearing structure as set forth in claim 19, wherein the axially polarized magnetic field generating means includes a plurality of electromagnetic coils circumferentially positioned about the stationary member between the pair of arcuate rings.

22. An electromagnetic bearing structure as set forth in claim 19, wherein the axially polarized magnetic field generating means includes permanent magnet means generally surrounding a portion of the rotatable member and linked magnetically to the arcuate rings by the pair of pole pieces.

23. An electromagnetic bearing structure as set forth in claim 19, wherein the rotatable member generally encircles the stationary member such that the rings and the axially polarized magnetic field generating means interiorly surround the rotatable member.

24. An electromagnetic bearing structure for supporting a rotatable member in a suspended position with respect to a stationary member, the bearing structure comprising:
   a pair of arcuate rings associated with the stationary member;
   a plurality of electromagnetic coils positioned on each of the rings circumferentially about the stationary member and radially spaced from the rotatable member;
   means for providing a controlled electrical current to the coils to generate- a radially polarized electromagnetic field surrounding the rotatable member;
   means for forming a pair of radial air gaps surrounding the rotatable member and located between the rings and the rotatable member to ensure magnetic flux generated by the coils to be linked to the rotatable member; and
   means associated with the stationary member for generating an axially polarized magnetic field, the generating means being positioned radially outwardly from the rotational member to surround a portion of the rotational member and being located intermediate of the pair of arcuate rings and associated electromagnetic coils, wherein the generating means is linked magnetically to the rotatable member through the pair of air gaps such that the axially directed flux from the generating means is re-oriented to radially pass through the air gaps to create a high density magnetic field and which provides for a magnetic field linked to the rotatable member.

25. An electromagnetic bearing structure as set forth in claim 24, including arcuately shaped pole pieces extending between the generating means and the pair of arcuate rings.

26. An electromagnetic bearing structure as set forth in claim 24, wherein the electromagnetic coils are controlled through a servo control system.

27. An electromagnetic bearing structure as set forth in claim 24, wherein the generating means includes a plurality of electromagnetic coils circumferentially positioned about the stationary member between the arcuate rings, and wherein the electromagnetic coils of the generating means generate a relatively constant magnetic flux.

* * * * *

UNITED STATES PATENT AND TRADEMARK OFFICE
CERTIFICATE OF CORRECTION

PATENT NO. : 5,111,102          Page 1 of 2
DATED      : May 5, 1992
INVENTOR(S): Crawford R. Meeks It is certified that error appears in the above-identified patent and that said Letters Patent is hereby corrected as shown below:

In column 5, line 60, delete "1 or 2-axis displacement" and insert therefor --, or Z-axis displacement,--.

In column 6, line 31, before "12" delete ".".

In column 6, line 33, after "magnet" insert --18--.

In column 7, line 15, delete "44".

In column 7, line 58, delete "the" and insert therefor --a--.

In column 7, line 62, delete "funeliseral" and insert therefor --functional--.

In column 7, line 64, delete "shaft" and insert therefor --shafts--.

In column 8, line 18, delete "42" and insert therefor --40--.

In column 8, line 30, delete "so" and insert therefor --to--.

In column 8, line 36, delete "as" and insert therefor --at--.

In column 8, line 40, after "circuit" insert --components--.

In column 9, line 4, after "contributing" insert --to--.

UNITED STATES PATENT AND TRADEMARK OFFICE
CERTIFICATE OF CORRECTION

PATENT NO. : 5,111,102
DATED : May 5, 1992
INVENTOR(S) : Crawford R. Meeks

It is certified that error appears in the above-identified patent and that said Letters Patent is hereby corrected as shown below:

In column 9, line 8, delete "magnet" and insert therefor --magnetic--.

In column 11, line 44, delete "two".

In column 12, line 35, after "generate" delete "-".

In the Abstract, line 10, insert --to-- between "coils" and "generate".

In the Abstract, line 18, delete "direct" and insert therefor --directed--.

Signed and Sealed this

Thirty-first Day of August, 1993

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,111,102

DATED : May 5, 1992

INVENTOR(S) : Crawford R. Meeks

It is certified that error appears in the above-identified patent and that said Letters Patent is hereby corrected as shown below:

On the face of the patent, delete "Notice: The portion of the term of this patent subsequent to Jan. 9, 2007 has been disclaimed.

Signed and Sealed this

Twenty-eighth Day of December, 1993

Attest:

BRUCE LEHMAN

Attesting Officer     Commissioner of Patents and Trademarks